United States Patent
Carney et al.

(10) Patent No.: US 8,617,309 B1
(45) Date of Patent: Dec. 31, 2013

(54) CEMENT COMPOSITIONS INCLUDING RESILIENT GRAPHITIC CARBON FRACTION

(71) Applicant: Superior Graphite Co., Chicago, IL (US)

(72) Inventors: Peter Roy Carney, Vero Beach, FL (US); Craig Allen Baer, Romeoville, IL (US); David J. Derwin, Prospect Heights, IL (US); Changjun Zhou, Chicago, IL (US); Frank A. Wawrzos, McHenry, IL (US); Marcin Tlustochowicz, Plainfield, IL (US)

(73) Assignee: Superior Graphite Co., Chicago, IL (US)

( * ) Notice: Subject to any disclaimer, the term of this patent is extended or adjusted under 35 U.S.C. 154(b) by 0 days.

(21) Appl. No.: 13/763,276

(22) Filed: Feb. 8, 2013

(51) Int. Cl.
*C04B 14/36* (2006.01)
*C04B 14/00* (2006.01)
*C04B 28/00* (2006.01)
*C04B 22/00* (2006.01)
*C04B 103/00* (2006.01)
*C04B 111/90* (2006.01)

(52) U.S. Cl.
USPC ............ 106/814; 106/668; 106/716; 106/717

(58) Field of Classification Search
USPC .................. 106/668, 717, 814, 716
See application file for complete search history.

(56) References Cited

U.S. PATENT DOCUMENTS

| | | | |
|---|---|---|---|
| 3,444,276 A * | 5/1969 | Olstowski et al. | 423/448 |
| 3,573,427 A | 4/1971 | Minsk | |
| 3,626,149 A | 12/1971 | Carney | |
| 4,103,103 A | 7/1978 | Hizikata | |
| 4,301,356 A | 11/1981 | Tanei et al. | |
| 4,564,745 A | 1/1986 | Deschenes | |
| 4,697,063 A | 9/1987 | Germundson | |
| 5,226,961 A | 7/1993 | Nahm et al. | |
| 5,447,564 A | 9/1995 | Xie et al. | |
| 5,505,987 A | 4/1996 | Jennings et al. | |
| 5,707,171 A | 1/1998 | Zaleski et al. | |
| 5,908,584 A | 6/1999 | Bennett | |
| 6,461,424 B1 | 10/2002 | Ramme et al. | |
| 6,971,819 B2 | 12/2005 | Zaleski et al. | |
| 7,341,627 B2 | 3/2008 | Ogden | |
| 7,488,705 B2 * | 2/2009 | Reddy et al. | 507/219 |
| 7,732,381 B2 | 6/2010 | Williams et al. | |
| 7,772,166 B1 | 8/2010 | Williams et al. | |
| 2006/0231966 A1 | 10/2006 | Tsung | |
| 2007/0186824 A1 | 8/2007 | Takahashi et al. | |
| 2011/0120347 A1 | 5/2011 | Chung et al. | |
| 2013/0043026 A1 * | 2/2013 | Taoutaou et al. | 166/293 |

* cited by examiner

*Primary Examiner* — Anthony J Green
(74) *Attorney, Agent, or Firm* — Cook Alex Ltd.

(57) ABSTRACT

A method for improving the thermal characteristics of cement compositions is provided in which fine resilient graphitic carbon particles ("RGC") are substituted for a portion of the fine aggregate (typically sand) in the cement formulation. For the purposes of the present disclosure, "fine" is intended to describe particulates having a mesh size of less than about 8 mesh, or a particle size of less than about 2.38 mm, or, more preferably when referring to RGC, a mesh size of less than about 16 mesh and a particle size of less than about 1.19 mm. "Resilient" is intended to describe graphitic carbon particles that exhibit a rebound of at least about 20% after compression to 10,000 psi.

11 Claims, 1 Drawing Sheet

| | Wt. % Sample A | Wt. % Sample B | Wt. % Sample C | Wt. % Sample D | Wt. % Sample E | Wt. % Sample F | Wt. % Sample G | Wt. % Sample H |
|---|---|---|---|---|---|---|---|---|
| CEMENT FORMULATIONS INCLUDING RGC FRACTION | | | | | | | | |
| Date of Sample Preparation | 6/28/12 9:10 | 6/27/12 7:05 | 6/27/12 8:05 | 6/27/12 9:07 | 6/27/12 10:05 | 6/28/12 7:10 | 6/27/12 10:57 | 6/28/12 8:10 |
| Cement | 15.38 | 16.52 | 17.12 | 17.16 | 17.54 | 15.39 | 16.52 | 16.47 |
| Coarse Aggregate | 45.45 | 48.39 | 50.18 | 49.13 | 52.00 | 44.94 | 48.18 | 48.47 |
| Fine Aggregate – RGC | (Control) -0- | 10.35 | 16.05 | 16.06 | 15.93 | (Control) -0- | 10.35 | 10.32 |
| Fine Aggregate – Sand | 32.26 | 17.32 | 8.96 | 9.80 | 6.20 | 32.75 | 17.37 | 17.34 |
| Water | 6.91 | 7.42 | 7.69 | 7.86 | 8.32 | 6.92 | 7.58 | 7.39 |
| TOTAL | 100.00 | 100.00 | 100.00 | 100.01 | 99.99 | 100.00 | 100.00 | 99.99 |

February 8, 2013

CEMENT COMPOSITIONS INCLUDING RESILIENT GRAPHITIC CARBON FRACTION

BACKGROUND

The present disclosure is directed to methods for improving the thermal and electrical properties of cement compositions and to formulations for cements having such properties and, more particularly to such methods and formulations in which fine resilient graphitic carbon particles are added to the formulations.

Electrically conductive and/or thermally transmissive cements are useful for a number of purposes, such as, but not limited to, heated pavement systems, indoor or outdoor heated/cooled flooring systems, heat dissipation in power plants or mechanical operations, and heat dissipation in structural systems.

It is known that the addition of graphite to cement compositions improves the thermal and electrical properties of the cement. See, e.g., U.S. Pat. No. 3,626,149 to Peter R. Carney et al., U.S. Pat. No. 5,226,961 to Nahm et al., U.S. Pat. No. 5,908,584 to Bennett, and U.S. Pat. No. 7,732,381 to Williams et al.

By way of the present disclosure, methods and formulations are provided for cements having a fine fraction comprising resilient graphitic carbon and having improved thermal and electrical characteristics.

SUMMARY

In accordance with one aspect of the disclosure, a method for improving the thermal and electrical characteristics of cement compositions is provided in which fine resilient graphitic carbon particles ("RGC") are substituted for a portion of the fine aggregate (typically sand) in the cement formulation. For the purposes of the present disclosure, "fine" is intended to describe particulates having a mesh size of less than about 8 mesh, or a particle size of less than about 2.38 mm, or, more preferably when referring to RGC, a mesh size of less than about 16 mesh and a particle size of less than about 1.19 mm. "Resilient" is intended to describe graphitic carbon particles that exhibit a rebound of at least about 20% after compression to 10,000 psi.

More specifically, RGC may be substituted for up to 100 vol % (or 100 wt %) of the fine aggregate in the dry-constituent concrete composition or, more preferably up to about 75 vol % (or approximately 64 wt %) of the fine aggregate in the dry-constituent mortar composition.

In another aspect, the RGC may comprise synthetic graphite, thermally treated calcined petroleum coke, or a combination thereof.

In another aspect of the disclosure, the cement mixtures to which the RGC is added may be the Portland cement formulations defined by ASTM C150, (particularly Types I, II, III and V), oil well cements (as defined by API and including Portland-type cements), and floor leveling gypsum-based cements (such as those sold by USG Corporation under the LEVELROCK® trademark and Maxxon Corporation under the GYP-CRETE® trademark).

In keeping with a further aspect of the disclosure, formulations are provided for cement compositions that include RGC as part or all of the fine fraction. Preferably, dry-constituent concrete compositions in accordance with the disclosure include: RGC: 0.5 wt %-32.3 wt %; coarse aggregate: 5.2 wt %-71.0 wt %; fine aggregate/sand: 0 wt % (full replacement by RGC)-88.6 wt %; and cement (Portland Type I/II): 15.7 wt %-23.2 wt %. Preferably, dry-constituent mortar compositions in accordance with the disclosure include: RGC: 0.5 wt %-37 wt %; coarse aggregate: 0 wt %; fine aggregate/sand: 0 wt % (full replacement by RGC)-76.2 wt %; and cement (Portland Type I/II): 23.3 wt %-40.0 wt %. In addition, the formulations may include a fly ash fraction as replacement for a portion of the cement of from 3.1 wt %-4.6 wt % for concrete, and of from 4.7 wt % to 8.0 wt % for mortar. Further aspects will become apparent upon reference to the following detailed description.

BRIEF DESCRIPTION OF THE DRAWING

FIG. 1 is a table setting forth the wt % of the various cement compositions prepared in connection with the testing reported below

DETAILED DESCRIPTION

The present invention relates cement/concrete formulations with a resilient graphitic carbon addition that imparts superior thermal conductivity, electrical resistivity, without degradation of mechanical performance. Because of the excellent thermal and electrical conductivity, cement/concrete products with resilient graphite addition may be used to help dissipate or conduct thermal energy by itself or with the incorporation of energy source (for example an electric heating element or metal pipe to transport fluids).

Resilient graphite may be produced by thermal treatment of calcined petroleum coke through a proprietary continuous fluid bed reactor technology. RGC particles are considered resilient if they rebound by at least 20%, and preferably by at least 35%, after applying a compaction pressure of 10,000 psi. More preferably, the resiliency values of the RGC product are greater than 100%.

Resiliency may be determined by use of a press by which pressure is applied to an un-compacted sample of material and released. More specifically, a test cylinder or die is loaded with a dry and free flowing amount of the material to be tested. The test cylinder is then mounted onto a press. Pressure is applied by the press to the sample (to 10,000 psi) and the height of the compacted sample ($h_o$) within the test cylinder is measured. The pressure is then released and the rebounded height of the sample in the test cylinder ($h_r$) is measured at 10 minutes after pressure is released, and then again at 20 minutes to make sure that the sample has stabilized. The resiliency (%) is then calculated as $100 \times (h_r/h_o - 1)$.

The cement portion of the mixtures may comprise various different types of cements. For example, the cement fractions of the mixtures comprised Portland cement, as defined by ASTM C 150. Tables 1 and 2 below, set forth the typical primary phases and chemical composition of Portland cement.

TABLE 1

Typical phases of Portland clinker plus Gypsum
Cement chemists notation under CCN.

| Clinker | CCN | Mass % |
|---|---|---|
| Tricalcium silicate $(CaO)_3 \cdot SiO_2$ | $C_3S$ | 45-75% |
| Dicalcium silicate $(CaO)_2 \cdot SiO_2$ | $C_2S$ | 7-32% |
| Tricalcium aluminate $(CaO)_3 \cdot Al_2O_3$ | $C_3A$ | 0-13% |
| Tetracalcium aluminoferrite $(CaO)_4 \cdot Al_2O_3 \cdot Fe_2O_3$ | $C_4AF$ | 0-18% |
| Gypsum $CaSO_4 \cdot 2\,H_2O$ | | 2-10% |

TABLE 2

Typical chemical composition of Portland cement
Cement chemists notation under CCN.

| Cement | CCN | Mass % |
|---|---|---|
| Calcium oxide, CaO | C | 61-67% |
| Silicon dioxide, $SiO_2$ | S | 19-23% |
| Aluminum oxide, $Al_2O_3$ | A | 2.5-6% |
| Ferric oxide, $Fe_2O_3$ | F | 0-6% |
| Sulfate | S | 1.5-4.5% |

There are five types of Portland cements with variations of the first three according to ASTM C150. Type I Portland cement is known as common or general purpose cement. When referring to Portland cement, it is generally assumed that Type I is being referred to unless another type is specified. Type I Portland cement is commonly used for general construction, especially when making precast and precast-prestressed concrete that is not to be in contact with soils or ground water. The typical phase compositions of this type are: 55% ($C_3S$), 19% ($C_2S$), 10% ($C_3A$), 7% ($C_4AF$), 2.8% (MgO), 2.9% ($SO_3$), 1.0% ($H_2O$ and $CO_2$), and 1.0% (free CaO). A limitation on the composition is that the ($C_3A$) shall not exceed fifteen percent.

Type II Portland cement is intended to have moderate sulfate resistance, with or without moderate heat of hydration. The typical phase composition is: 51% ($C_3S$), 24% ($C_2S$), 6% ($C_3A$), 11% ($C_4AF$), 2.9% (MgO), 2.5% ($SO_3$), 0.8% ($H_2O$ and $CO_2$), and 1.0% (free CaO). A limitation on the Type II composition is that the ($C_3A$) shall not exceed eight percent, which reduces its vulnerability to sulfates. This type is for general construction that is exposed to moderate sulfate attack, and is typically used where concrete is in contact with soils and ground water, especially in the western United States due to the high sulfur content of the soil. Because Type I and II cements are comparably priced, Type II is used as a general purpose cement, and the majority of Portland cement sold in North America meets this specification.

Type III Portland cement has relatively high early strength. The typical phase composition is: 57% ($C_3S$), 19% ($C_2S$), 10% ($C_3A$), 7% ($C_4AF$), 3.0% (MgO), 3.1% ($SO_3$), 0.9% ($H_2O$ and $CO_2$), and 1.3% (free CaO). Type III is similar to Type I, but ground finer. Some manufacturers make a separate clinker with higher $C_3S$ and/or $C_3A$ content, but this is increasingly rare, and the general purpose clinker is usually used, ground to a specific surface typically 50-80% higher than Type I. The gypsum level may also be increased a small amount. This gives the concrete using this type of cement a three day compressive strength equal to the seven day compressive strength of Types I and II. The seven day compressive strength of concrete using Type III cement is almost equal to concrete using Type I and II cements, while the six month strength of Type III concrete is the same or slightly less than that of Type I and II concrete. Type III concrete is commonly used for precast concrete manufacture, where high 1-day strength allows for a fast turnover of molds, in emergency construction and repairs, and in construction of machine bases and gate installations.

Type IV Portland cement is generally known for its low heat of hydration. The typical phase composition for Type IV cement is: 28% ($C_3S$), 49% ($C_2S$), 4% ($C_3A$), 12% ($C_4AF$), 1.8% (MgO), 1.9% ($SO_3$), 0.9% ($H_2O$ and $CO_2$), and 0.8% (free CaO). The percentages of ($C_2S$) and ($C_4AF$) are relatively high and ($C_3S$) and ($C_3A$) are relatively low. A limitation on Type IV cement is that the maximum percentage of ($C_3A$) is seven, and the maximum percentage of ($C_3S$) is thirty-five. This causes the heat given off by the hydration reaction to develop at a slower rate. However, as a consequence, the strength of the concrete develops slowly. After one or two years the strength is higher than the other types after full curing. Type IV cement is used for very large concrete structures, such as dams, which have a low surface to volume ratio.

Type V Portland cement is used where sulfate resistance is important. The typical phase composition for Type V cement is: 38% ($C_3S$), 43% ($C_2S$), 4% ($C_3A$), 9% ($C_4AF$), 1.9% (MgO), 1.8% ($SO_3$), 0.9% ($H_2O$ and $CO_2$), and 0.8% (free CaO). Type V cement has a very low ($C_3A$) content, which accounts for its high sulfate resistance. The maximum content of ($C_3A$) allowed is five percent for Type V Portland cement. Another limitation is that the ($C_4AF$)+2($C_3A$) fraction cannot exceed twenty percent. Type V cement is used in concrete that is to be exposed to alkali soil and ground water sulfates which react with ($C_3A$) causing disruptive expansion. While generally unavailable in many places, its use is common in the western United States and Canada. As with Type IV, Type V Portland cement has mainly been supplanted by the use of ordinary cement with added ground granulated blast furnace slag or tertiary blended cements containing slag and fly ash.

Types Ia, IIa, and IIIa Portland cements have the same composition as Types I, II, and III. They differ in that Types Ia, IIa, and IIIa additionally include an air-entraining agent ground into the mix. The air-entrainment must meet the minimum and maximum optional specification found in the ASTM manual. These types are generally only available in the eastern United States and Canada.

Types II(MH) and II(MH)a have compositions similar to Types II and IIa, but with moderate heat of hydration. (These cements were added to ASTM C-150 in 2009.)

RGC may also be combined with self-leveling cements (typically including gypsum) and oil well cements in accordance with the present disclosure to obtain improved thermal and electrical characteristics.

In accordance with the present disclosure, the compositions include: RGC, coarse aggregate, fine aggregate/sand, cement, and, optionally, fly ash in the wt % proportions indicated in Table 3. The formulations may also include water reducing and/or air entraining admixtures.

TABLE 3

| | Mortar application, as wt % of dry mix | | Concrete application, as wt % of dry mix | |
|---|---|---|---|---|
| | Low | High | Low | High |
| Coarse aggregate | 0.0 | 0.0 | 5.2 | 71.0 |
| Fine aggregate | 21.0 | 76.2 | 0.0 | 88.6 |
| RGC | 0.5 | 39.0 | 0.5 | 32.3 |
| Cement, type I/II | 23.3 | 40.0 | 15.7 | 23.2 |
| Coarse aggregate | 0.0 | 0.0 | 5.2 | 71.0 |
| Fine aggregate | 21.0 | 76.2 | 0.0 | 88.6 |
| RGC | 0.5 | 39.0 | 0.5 | 32.3 |
| Cement, type I/II | 8.6 | 32.0 | 12.5 | 18.6 |
| Fly ash | 4.7 | 8.0 | 3.1 | 4.6 |

Mixes with fly ash - dry mix breakdowns.

Testing

A series of concrete mixes were prepared in accordance with ASTM C192 in which RGC was substituted for a portion of the fine aggregate (sand) fraction. With reference to FIG. 1, eight samples were prepared (Samples A-H), with two samples (Samples A and F) being control samples, in which the fine aggregate did not include any RGC. Each sample included cement, coarse aggregate, fine aggregate (RGC and sand), and water. The RGC and sand had similar gradation, as set forth in ASTM C778 for standard sand, with a minor amount of the material finer than #100 mesh. With the exception of the control samples and samples C and D (which did not have acceptable workability characteristics), the fractions, in wt %, were as follows: cement: 16.47-17.54; coarse aggregate: 48.18-52.00; fine RGC: 10.32-15.93; fine sand: 6.20-17.37; and water: 7.39-7.86.

The samples were tested for compressive strength (ASTM C39), thermal diffusivity (USAGE CRD C36), specific heat (USAGE CRD C124), and freeze-thaw characteristics (ASTM C666). Thermal conductivity of samples including a RGC fraction was found to increase significantly relative to the control samples, by about 110%, from 14.3 BTU in/ft² h F to 30.2 BTU in/ft² h F, at 75% fine aggregate replacement by volume, with minor adjustments to the coarse/fine aggregate ratio to improve workability. Moderate improvement in freeze-thaw resistance was also observed in the experiments. The mechanical properties were sufficient to qualify all the tested mixtures for paving, indoor and outdoor flooring and structural concrete applications.

Thus, improved cement compositions including a RGC fraction have been disclosed. The compositions have been described in the context of certain preferred embodiments, with specified values and ranges for the various fractions, for purposes of illustration. However, it should be understood that for the ranges listed it is intended that any and every value within the range, including the end points, is considered as having been stated, and, even if specific data points are explicitly identified, it is to be considered that all data points within the range are specified.

The invention claimed is:

1. A concrete composition comprising a fine fraction that is partially or entirely resilient graphitic carbon particles having a mesh size of less than about 8 mesh (−2.38 mm) and exhibiting a rebound of at least about 20% after compression to 10,000 psi, wherein the resilient graphitic carbon particles are selected from synthetic graphite, thermally treated calcined petroleum coke, and a combination synthetic graphite and thermally treated calcined petroleum coke, the concrete composition further comprising: 0.5 wt %-32.3. wt % resilient graphitic carbon; 5.2 wt %-71.0 wt % coarse aggregate; 0 wt %-88.6 wt % fine aggregate; and 15.7 wt %-23.2 wt % cement.

2. The concrete composition of claim 1 wherein 3.1 wt %-4.6 wt % fly ash is substituted for an equal amount of the cement portion.

3. The concrete composition of claim 1 wherein the cement comprises one or more of Portland cement formulations ASTM C150 Types I, II, III and V, oil well Portland cements, gypsum-cement blends, fly ash-cement blends, and floor leveling gypsum-based cements.

4. A concrete composition comprising a fine fraction that is partially or entirely resilient graphitic carbon particles having a mesh size of less than about 8 mesh (−2.38 mm) and exhibiting a rebound of at least about 20% after compression to 10,000 psi, wherein the resilient graphitic carbon particles are selected from synthetic graphite, thermally treated calcined petroleum coke, and a combination synthetic graphite and thermally treated calcined petroleum coke, the concrete composition further comprising: 0.5 wt %-39.0 wt % resilient graphitic carbon; 0 wt % coarse aggregate; 21.0 wt %-76.2 wt % fine aggregate; and 23.3 wt %-40.0 wt % cement.

5. The concrete composition of claim 4 wherein 4.7 wt %-8.0 wt % fly ash is substituted for an equal amount of the cement portion.

6. The concrete composition of claim 4 wherein the cement comprises one or more of Portland cement formulations ASTM C150 Types I, II, III and V, oil well Portland cements, gypsum-cement blends, fly ash-cement blends, and floor leveling gypsum-based cements.

7. A method for improving the thermal and electrical characteristics of a concrete composition including a fine aggregate fraction comprising substituting fine resilient graphitic carbon particles for a portion of the fine aggregate such that the concrete has composition in accordance with claim 1 or 4.

8. The method of claim 7 wherein the fine aggregate and fine resilient graphitic carbon particles have a mesh size of less than about 8 mesh (−2.38 mm).

9. The method of claim 8 wherein the resilient graphitic carbon particles exhibit a rebound of at least about 20% after compression to 10,000 psi.

10. The method of claim 9 wherein the resilient graphitic carbon particles are selected from synthetic graphite, thermally treated calcined petroleum coke, and a combination synthetic graphite and thermally treated calcined petroleum coke.

11. The method of claim 10 wherein the concrete composition to which the resilient graphitic carbon particles is added comprises one or more of Portland cement formulations ASTM C150 Types I, II, III and V, oil well Portland cements, gypsum-cement blends, fly ash-cement blends, and floor leveling gypsum-based cements.

* * * * *